UNITED STATES PATENT OFFICE.

FREDERICK GUTZKOW, OF SAN FRANCISCO, CALIFORNIA.

IMPROVEMENT IN PROCESSES OF REFINING RETORTED AMALGAM.

Specification forming part of Letters Patent No. 205,187, dated June 25, 1878; application filed May 18, 1878.

*To all whom it may concern:*

Be it known that I, FREDERICK GUTZKOW, of the city and county of San Francisco, in the State of California, have invented a new and useful Process of Refining Retorted Amalgam, of which the following is a clear and exact description:

My invention has reference to an improved process or method of refining such amalgam as contains a considerable proportion of copper, and which would, after retorting and melting by the ordinary method, yield a low-grade bullion.

To accomplish my invention, I use only such implements and apparatus as are commonly known.

I retort the amalgam in the usual manner, taking care to avoid melting the retorted amalgam toward the end of the retorting process by maintaining only a moderate heat. The retorted bullion I then divide into two parts by weight, the proportion between the two parts depending on the average fineness of the bullion or retorted produce.

For bullion which, without refining, would assay .780 in silver, I divide into two equal parts. One of these parts—or, in other words, one-half of the total bullion—I dissolve in concentrated sulphuric acid in a cast-iron kettle. The solution thus obtained I pour into a lead-lined tank which contains a certain quantity of water, when a large proportion of sulphate of silver will drop to the bottom. I then heat the solution to the boiling-point and place into the liquid thus prepared the other part—that is, the second half of the bullion.

The silver which is dissolved from the first half of the bullion is precipitated by the copper from the second half, the copper dissolving. As fast as the silver is separated from the solution fresh sulphate of silver will dissolve, and the process is finished when no more silver is in the solution. The latter is now a strong solution of sulphate of copper, which is run off for crystallization. The proportion of water to bullion ought to be such that a solution will be obtained strong enough to be run off at once into the crystallizing-tank.

The spongy mass of silver remaining in the tank is then washed, dried, and melted into fine bullion.

For amalgam that will yield a bullion of higher grade than .780 less than one-half need be dissolved—for instance, only one-third of the whole for a fineness of .875, or one-quarter for a fineness of .915.

Having thus described my invention, what I claim, and desire to secure by Letters Patent, is—

The herein-described process of refining retorted amalgam, consisting in dissolving a portion of said amalgam in sulphuric acid, subsequently adding another portion of amalgam to the solution, whereby the silver is precipitated and the copper dissolved, substantially as above specified.

In witness whereof I have hereunto set my hand and seal.

FREDERICK GUTZKOW. [L. S.]

Witnesses:
W. F. CLARK,
JNO. L. BOONE.